(12) United States Patent
Hatano

(10) Patent No.: US 9,903,484 B2
(45) Date of Patent: Feb. 27, 2018

(54) FLOW PASSAGE SWITCHING UNIT

(71) Applicant: SMC Corporation, Chiyoda-ku (JP)

(72) Inventor: Katsushi Hatano, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/099,811

(22) Filed: Apr. 15, 2016

(65) Prior Publication Data

US 2016/0327168 A1  Nov. 10, 2016

(30) Foreign Application Priority Data

May 8, 2015 (JP) ................................. 2015-095433

(51) Int. Cl.
*F15B 13/043* (2006.01)
*F16K 11/07* (2006.01)
*F16K 31/124* (2006.01)
*F16K 31/42* (2006.01)

(52) U.S. Cl.
CPC ............ *F16K 11/07* (2013.01); *F16K 31/124* (2013.01); *F16K 31/426* (2013.01); *Y10T 137/86614* (2015.04)

(58) Field of Classification Search
CPC .. F16K 99/0059; F16K 31/1245; F16K 11/07; F16K 31/124; F16K 31/426; F15B 13/0402; F15B 13/0426; F15B 13/0433; F15B 13/043; F15B 13/0431; F15B 13/015; F15B 13/0435; F15B 11/123; Y10T 137/86614; Y10T 137/87885; Y10T 137/87193; Y10T 137/87209
USPC .................. 137/625.64, 884, 596.16, 596.14
See application file for complete search history.

(56) References Cited

U.S. PATENT DOCUMENTS

| | | | | | |
|---|---|---|---|---|---|
| 5,462,087 | A | * | 10/1995 | Fukano | ............... F15B 13/0825 137/596.16 |
| 6,012,490 | A | * | 1/2000 | Tajima | ................ F15B 13/0402 137/116.5 |
| 8,925,587 | B2 | * | 1/2015 | Miyazoe | ............. F15B 13/0402 137/596.14 |
| 8,978,701 | B2 | * | 3/2015 | Miyazoe | ................. F16K 11/02 137/625.64 |
| 9,528,616 | B2 | * | 12/2016 | Nishiyama | .............. F16K 11/10 |
| 2013/0019958 | A1 | | 1/2013 | Miyazoe et al. | |

FOREIGN PATENT DOCUMENTS

JP  2013-24345  2/2013

* cited by examiner

*Primary Examiner* — Craig J Price
(74) *Attorney, Agent, or Firm* — Oblon, McClelland, Maier & Neustadt, L.L.P.

(57) ABSTRACT

A flow passage switching unit includes a valve body in which plural ports are formed, a spool arranged slidably in axial directions in the interior of the valve body, a spool drive unit for driving the spool in an A direction, a biasing mechanism that is configured to bias the spool elastically in the interior of the valve body, and a piston section that exerts a force on the spool in a B direction based on the pressure of a first output port.

3 Claims, 4 Drawing Sheets

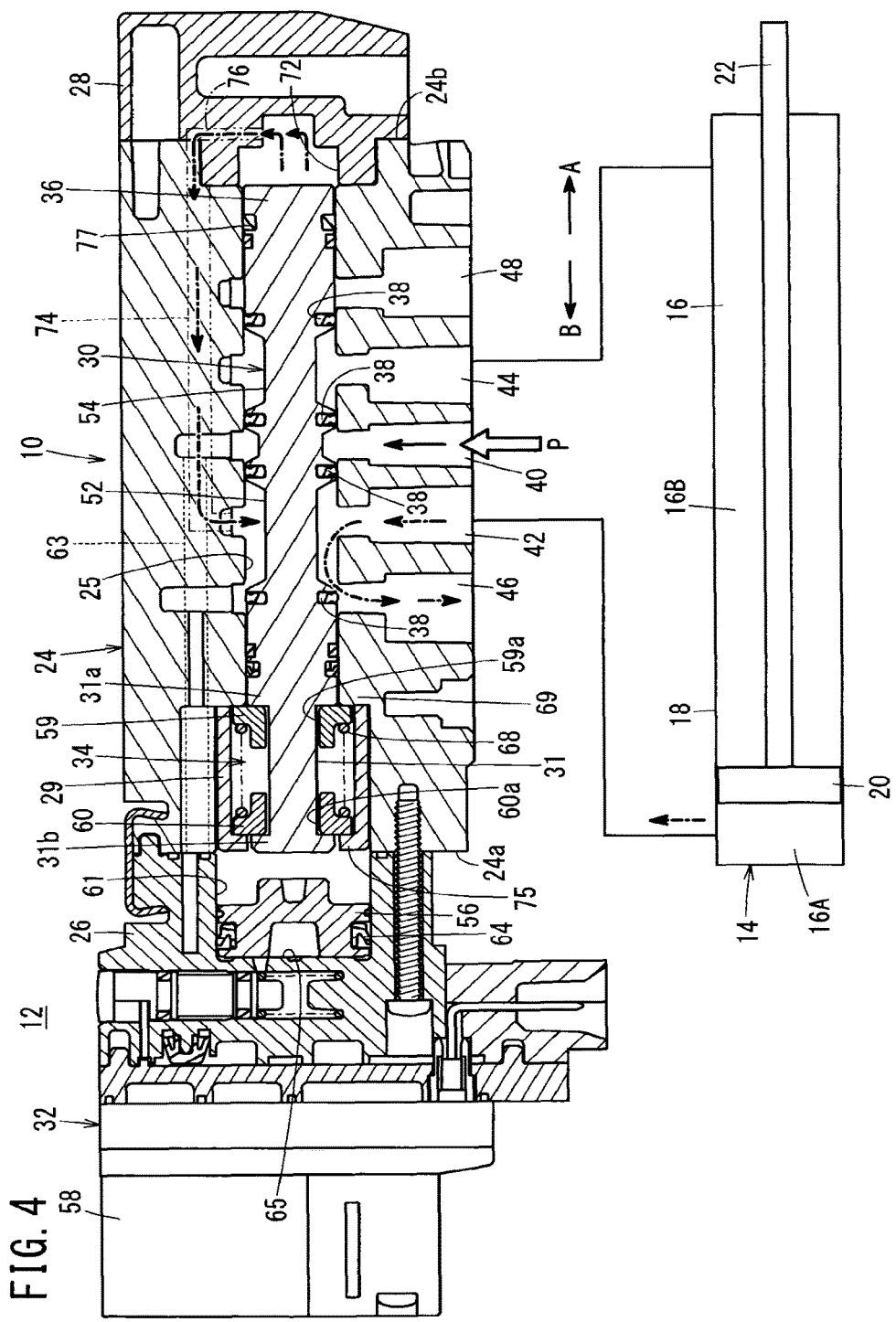

FLOW PASSAGE SWITCHING UNIT

CROSS-REFERENCE TO RELATED APPLICATION

This application is based upon and claims the benefit of priority from Japanese Patent Application No. 2015-095433 filed on May 8, 2015, the contents of which are incorporated herein by reference.

BACKGROUND OF THE INVENTION

Field of the Invention

The present invention relates to a flow passage switching unit, which is used in a pneumatic system equipped with an air cylinder.

Description of the Related Art

In an air cylinder, which is widely used as a pneumatic actuator in various types of automated machinery, a piston to which a rod is fixed is moved reciprocally by supply and discharge of compressed air in respective pressure chambers thereof. Additionally, in general, supply and discharge of compressed air with respect to this type of air cylinder is carried out through a switching valve.

Incidentally, in the aforementioned air cylinder, during a working stroke for performing work from among the reciprocating movements of the piston, since an external load is applied to the rod, a large driving force is required. In contrast thereto, during a return stroke when the piston is returned to its original position, since the aforementioned external load is not applied to the rod, the return stroke is completed with a smaller driving force than during the working stroke. The driving force depends on pressure level of the compressed air that is supplied to the pressure chambers. A savings in the amount of air consumption can be realized by reducing the pressure at the time of the return stroke.

Thus, to resolve the above-described problem, an energy-saving valve has been proposed by Japanese Laid-Open Patent Publication No. 2013-024345. The energy-saving valve is equipped with a main valve body in which a valve hole, an air supply port, a first output port, a second output port, and an exhaust port are formed, a single spool slidably inserted in the valve hole, and which connects the first output port and the second output port, respectively, to the air supply port or the exhaust port, a spool driving section that switches the spool from a first position to a second position, and a pressure regulating piston having a pressure receiving surface which is acted on by a pressure from the second output port, and on which an elastic biasing force is exerted. Corresponding to the pressure of the second output port, the spool is moved so as to change the cross-sectional area of a flow passage that passes from the air supply port to the second output port, whereby the spool sets the pressure of the second output port to a set pressure that is smaller than the pressure of the compressed air supplied from the air supply port.

SUMMARY OF THE INVENTION

The present invention has been devised in relation to the conventional technique described above, and has the object of providing a flow passage switching unit, which is capable of suppressing running costs and initial costs owing to a savings in air consumption, and with a simple structure, is excellent in terms of economical usage thereof.

For achieving the above object, according to the present invention, a flow passage switching unit is provided, which is used in a pneumatic system equipped with an air cylinder, the air cylinder being configured to perform a working stroke of a piston by introduction of compressed air into a first pressure chamber, and perform a return stroke of the piston by introduction of the compressed air into a second pressure chamber, the flow passage switching unit including a valve body in which there are formed a valve hole, an air supply port to which compressed air is supplied from a pressure supply source, a first output port connected to the first pressure chamber, a second output port connected to the second pressure chamber, and an exhaust port that is opened to atmosphere, wherein the air supply port, the first output port, the second output port, and the exhaust port communicate with the valve hole, a spool including a first end and a second end in an axial direction thereof, the spool being configured to be slidable reciprocally in the axial direction in the valve hole, a spool drive unit including a solenoid valve, the spool drive unit being configured to drive the spool in a first direction from a side of the first end toward a side of the second end, by exerting a force on the first end of the spool depending on an energized state of the solenoid valve, a biasing mechanism disposed in the interior of the valve body, the biasing mechanism being configured to bias the spool elastically, and a piston section arranged in the interior of the valve body, the piston section being configured to exert a force on the spool in a second direction opposite to the first direction based on a pressure of the first output port. In the flow passage switching unit, when the spool drive unit is in an off state and the force exerted by the piston section based on the pressure of the first output port is greater than a biasing force of the biasing mechanism, the spool is positioned in a first position that allows communication between the first output port and the exhaust port, and allows communication between the air supply port and the second output port, in opposition to the biasing force of the biasing mechanism. In addition, when the force exerted by the piston section based on the pressure of the first output port is less than the biasing force of the biasing mechanism, due to the biasing force of the biasing mechanism, the spool is moved to a second position in which the air supply port is not allowed to communicate with either of the first output port and the second output port.

In accordance with the flow passage switching unit which is constituted as described above, when the piston reaches its stroke end during the return stroke of the air cylinder, the spool is made to move by the elastic force of the biasing mechanism to the second position (closed center) at which the air supply port does not communicate with either of the first output port and the second output port. Therefore, simultaneously with completion of the return stroke of the air cylinder, any unnecessary introduction of compressed air into the second pressure chamber is blocked, and a rise in pressure of the second pressure chamber is stopped. Consequently, at the time of the return stroke, due to a savings in air consumption, running costs can be suppressed. Further, the flow passage switching unit is simple in structure and excellent in terms of economical usage thereof.

In the above-described flow passage switching unit, the spool drive unit may include a drive piston configured to receive a pressure of the compressed air when the air supply port and the first output port are placed in communication, and a pressure receiving area of the drive piston may be greater than a pressure receiving area of the piston section.

Due to such a structure, by making use of the difference in the pressure receiving areas, owing to the drive piston that receives the pressure of the compressed air, the spool can reliably be moved to the position at which the air supply port and the first output port are placed in communication. Thus, the working stroke of the air cylinder can be performed without any problems.

In the above-described flow passage switching unit, a stopper portion, which is configured to stop the biasing mechanism by engagement therewith, may be provided in the interior of the valve body, and when the spool moves from the first position to the second position under a biasing action of the biasing mechanism, the spool may be stopped in the second position as a result of the stopper portion stopping the biasing mechanism by engagement therewith.

Due to such a structure, the spool can reliably be moved to the second position accompanying completion of the return stroke of the air cylinder.

In accordance with the flow passage switching unit of the present invention, running costs and initial costs can be suppressed owing to a savings in air consumption, and with a simple structure, the flow passage switching unit is excellent in terms of economical usage thereof.

The above and other objects, features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a fourth explanatory drawing of operations of the pneumatic system shown in FIG. 1.

DESCRIPTION OF THE PREFERRED EMBODIMENTS

A preferred embodiment of a flow passage unit and a flow passage switching unit according to the present invention will be presented and described in detail below with reference to the accompanying drawings.

Figure 1:
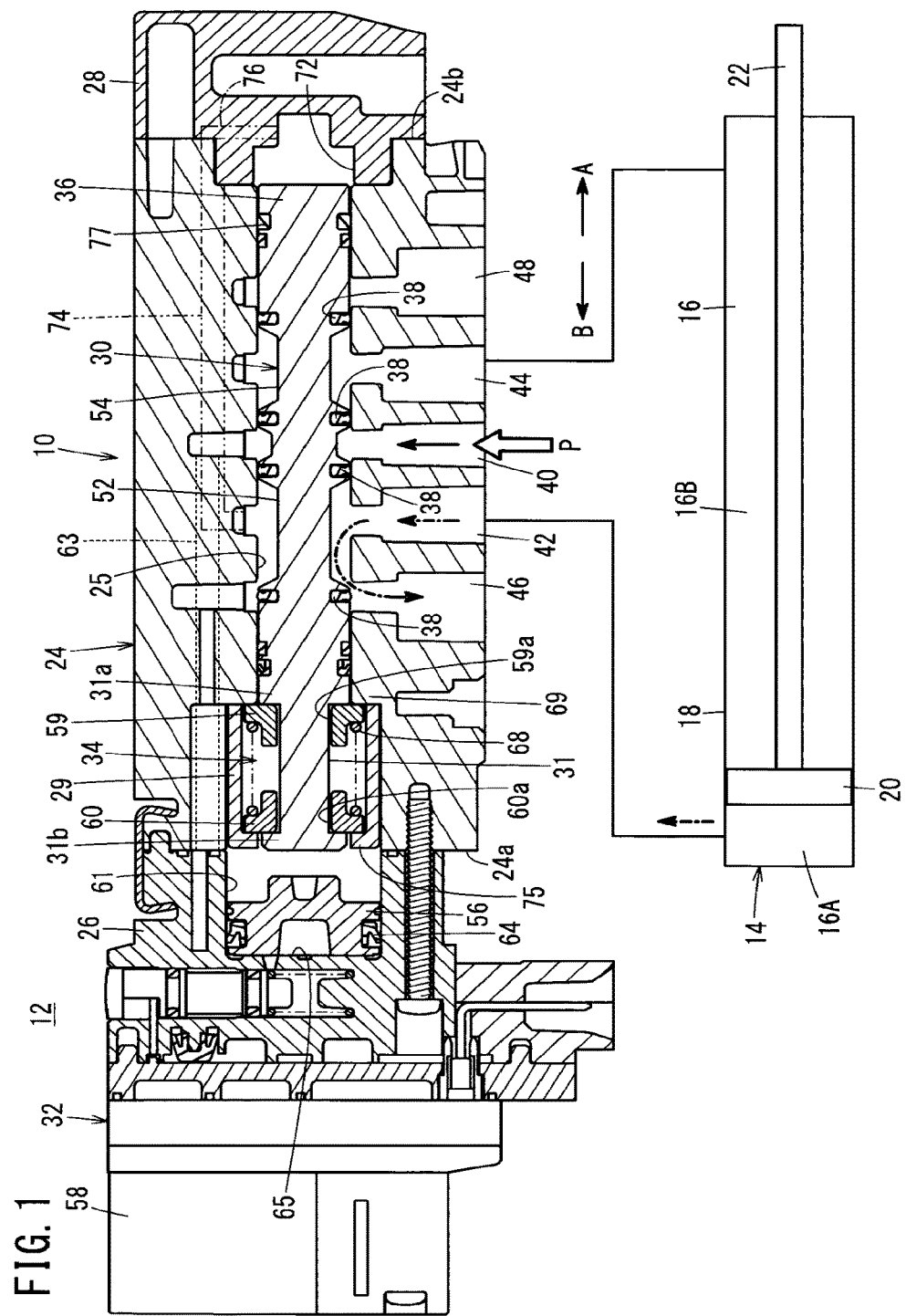
FIG. 1 is an outline schematic view (first explanatory drawing of operations) of a pneumatic system equipped with a flow passage switching unit according to an embodiment of the present invention.

The flow passage switching unit 10 according to an embodiment of the present invention shown in FIG. 1 is used in a pneumatic system 12 equipped with an air cylinder 14. The air cylinder 14 includes a cylinder tube 18 in which a piston chamber 16 is formed, a piston 20 which is arranged for slidable reciprocal movement in the interior of the cylinder tube 18, and a piston rod 22 connected to the piston 20.

By the piston 20, the piston chamber 16 is partitioned into a first pressure chamber 16A and a second pressure chamber 16B. In the air cylinder 14, by compressed air being supplied to the first pressure chamber 16A, a working stroke is performed for effecting work, and by compressed air being supplied to the second pressure chamber 16B, a return stroke is performed to return the piston 20 to its initial position.

The pneumatic system 12 comprises the aforementioned air cylinder 14, and the flow passage switching unit 10 for switching between supply and discharge of compressed air from a non-illustrated pressure supply source (an air compressor or the like) with respect to the air cylinder 14.

The flow passage switching unit 10 includes a valve body 24 in which a valve hole 25 and plural ports are formed, an adapter 26 that is connected in a fixed manner to a first end 24a in the axial direction of the valve body 24, an end plate 28 that is connected in a fixed manner to a second end 24b on an opposite side from the first end 24a of the valve body 24, a spool 30 arranged in the interior of the valve body 24 so as to be slidable in a reciprocating manner in the axial direction, a spool drive unit 32 for driving the spool 30 in a first direction (A direction) toward the second end 24b from the first end 24a, a biasing mechanism 34 that is capable of biasing the spool 30 elastically, and a piston section 36 that exerts a force on the spool 30 in a second direction (B direction) which is opposite to the first direction.

The valve hole 25 is formed to penetrate in the axial direction through the valve body 24, and the spool 30 is arranged so as to be slidable reciprocally in the interior of the valve hole 25. Plural annular seal members 38 are mounted with gaps therebetween in the axial direction on outer circumferential parts of the spool 30.

The plural ports in the valve body 24 include an air supply port 40, a first output port 42, a second output port 44, a first exhaust port 46, and a second exhaust port 48. The air supply port 40, the first output port 42, the second output port 44, the first exhaust port 46, and the second exhaust port 48 communicate with the valve hole 25.

In place of the first exhaust port 46 and the second exhaust port 48, which are provided separately, a single common exhaust port may be provided in the valve body 24.

Compressed air is supplied from the pressure supply source to the air supply port 40. Corresponding to the position of the spool 30, the first output port 42 is capable of communicating selectively with the air supply port 40 and the first exhaust port 46 through an annular first recess 52 provided on the spool 30. Further, corresponding to the position of the spool 30, the second output port 44 is capable of communicating selectively with the air supply port 40 and the second exhaust port 48 through an annular second recess 54 provided on the spool 30. The first recess 52 and the second recess 54 are disposed at different locations on the spool 30 in the axial direction.

Corresponding to the position of the spool 30 in the axial direction, the flow passage switching unit 10 is operated between a switched state in which the air supply port 40 and the first output port 42 are placed in communication, and the second output port 44 and the second exhaust port 48 are placed in communication (FIG. 2), a switched state in which the air supply port 40 and the second output port 44 are placed in communication, and the first output port 42 and the first exhaust port 46 are placed in communication (FIG. 3), and a switched state in which the air supply port 40 is not placed in communication with either of the first output port 42 and the second output port 44 (FIG. 1, FIG. 4).

In the illustrated example, the air supply port 40, the first output port 42, the second output port 44, the first exhaust port 46, and the second exhaust port 48 are disposed on the same side in the valve body 24. In a modification thereof, the air supply port 40, the first output port 42, the second output port 44, the first exhaust port 46, and the second exhaust port 48 may be disposed in a distributed manner on one side and another side in the valve body 24. For example, the first output port 42 and the second output port 44 may be disposed on one side in the valve body 24, whereas the air supply port 40, the first exhaust port 46, and the second exhaust port 48 may be disposed on another side in the valve body 24.

The spool drive unit 32 includes a drive piston 56 that is arranged slidably in the axial direction of the spool 30 and presses on the spool 30 in the A direction, and a solenoid valve 58 that drives the drive piston 56. A recess 61 that opens on the side of the valve body 24 is disposed in the adapter 26, and the drive piston 56 is arranged slidably in the interior of the recess 61. A ring-shaped seal member 64 is mounted on an outer circumferential part of the drive piston 56. The seal member 64 is held in close contact along the entire circumference on an inner circumferential surface of the adapter 26.

The solenoid valve 58 is constituted so as to cause a pressure of the compressed air that is supplied to the air supply port 40 to be exerted on a pressure receiving surface of the drive piston 56, which is disposed on an opposite side thereof from the spool 30, to thereby drive the drive piston 56 in the A direction. A flow path in the interior of the solenoid valve 58 communicates with the air supply port 40, through an air flow passage 63 that is formed in the valve body 24 and an air flow passage that is formed in the adapter 26. The solenoid valve 58 is switched such that when it is turned on by supply of current thereto, compressed air is allowed to flow into a pressure acting chamber 65, and when it is turned off by canceling the supply of current thereto, the air in the interior of the pressure acting chamber 65 is discharged to the exterior.

The biasing mechanism 34 is arranged in the interior of the valve body 24, and is constructed to be capable of biasing the spool 30 elastically in the axial direction. More specifically, according to the present embodiment, the biasing mechanism 34 includes a first movable member 59 and a second movable member 60 that are capable of moving in the axial direction of the spool 30, and an elastic member 68 (coil spring) retained between the first movable member 59 and the second movable member 60. A tubular member 29 is arranged inside the valve body 24 on the side of the first end 24a, and the biasing mechanism 34 is arranged inside the tubular member 29.

The first movable member 59 is constructed in a ring shape including a through hole 59a therein. The second movable member 60 is constructed in a ring shape including a through hole 60a therein. A shaft of the spool 30 on the B direction side thereof is inserted through the through hole 59a of the first movable member 59 and the through hole 60a of the second movable member 60. An annular recess 31 (small diameter portion) in which the first movable member 59 and the second movable member 60 are received is formed in the spool 30. As shown in FIG. 1, the first movable member 59 is engaged with a stepped portion 31a provided on the A direction side of the annular recess 31, and the second movable member 60 is engaged with a stepped portion 31b provided on the B direction side of the annular recess 31.

A first stopper portion 69, which regulates a movement limit position toward the A direction side of the first movable member 59 by stopping the first movable member 59 in an engaged state with the first movable member 59, is provided on the valve body 24. On the other hand, a second stopper portion 75, which regulates a movement limit position toward the B direction side of the second movable member 60 by stopping the second movable member 60 in an engaged state with the second movable member 60, is provided on the tubular member 29.

One end of the elastic member 68 abuts against the first movable member 59. Another end of the elastic member 68 abuts against the second movable member 60.

The piston section 36 is arranged in the interior of the valve body 24, and is constructed so as to exert a force on the spool 30 in a second direction (B direction) based on the pressure of the first output port 42. A packing 77 is installed on an outer circumferential part of the piston section 36. According to the present embodiment, the piston section 36 is formed integrally on an end of the spool 30 located in the A direction. However, the piston section 36 may also be constituted as a separate component apart from the spool 30.

A pressure acting chamber 72 that confronts the piston section 36, and a communication passage 76 that communicates between the pressure acting chamber 72 and an air flow passage 74 disposed in the valve body 24, are formed in the end plate 28. A pressure of the first output port 42 is exerted, through the air flow passage 74 and the communication passage 76, on the pressure receiving surface of the piston section 36. Consequently, the piston section 36 biases the spool 30 in the B direction based on the pressure of the first output port 42. The pressure receiving area of the aforementioned drive piston 56 is greater than the pressure receiving area of the piston section 36.

The biasing force (elastic force) of the above-described elastic member 68 in the A direction with respect to the spool 30 is less than the force at which the piston section 36 biases the spool 30 in the B direction by the pressure of the first output port 42 when the air cylinder 14 performs the return stroke. Consequently, in a state in which compressed air is supplied to the air supply port 40, when the spool drive unit 32 is switched from the on state to the off state, due to the biasing force in the B direction of the piston section 36 based on the pressure of the first output port 42, the spool 30 is made to move in the B direction in opposition to the biasing force of the biasing mechanism 34 (elastic member 68) in the A direction.

Further, when the return stroke of the air cylinder 14 is completed, the biasing force in the B direction of the piston section 36 with respect to the spool 30 becomes smaller than the biasing force of the biasing mechanism 34 in the A direction. Therefore, the spool 30 is made to move in the A direction as a result of the biasing force of the biasing mechanism 34 in the A direction.

Next, operations and effects of the flow passage switching unit 10, which is constructed as described above, will be described.

In FIG. 1, although compressed air from the pressure supply source is being supplied to the air supply port 40, the solenoid valve 58 of the spool drive unit 32 is in an off state, and the spool 30 is positioned at a position (closed center) at which the air supply port 40 does not communicate with either of the first output port 42 and the second output port 44. Further, the piston 20 of the air cylinder 14 is positioned in an initial position (a stroke end on the return side), and is retained in a state with a small amount of air pressure still remaining in the second pressure chamber 16B.

Figure 2:
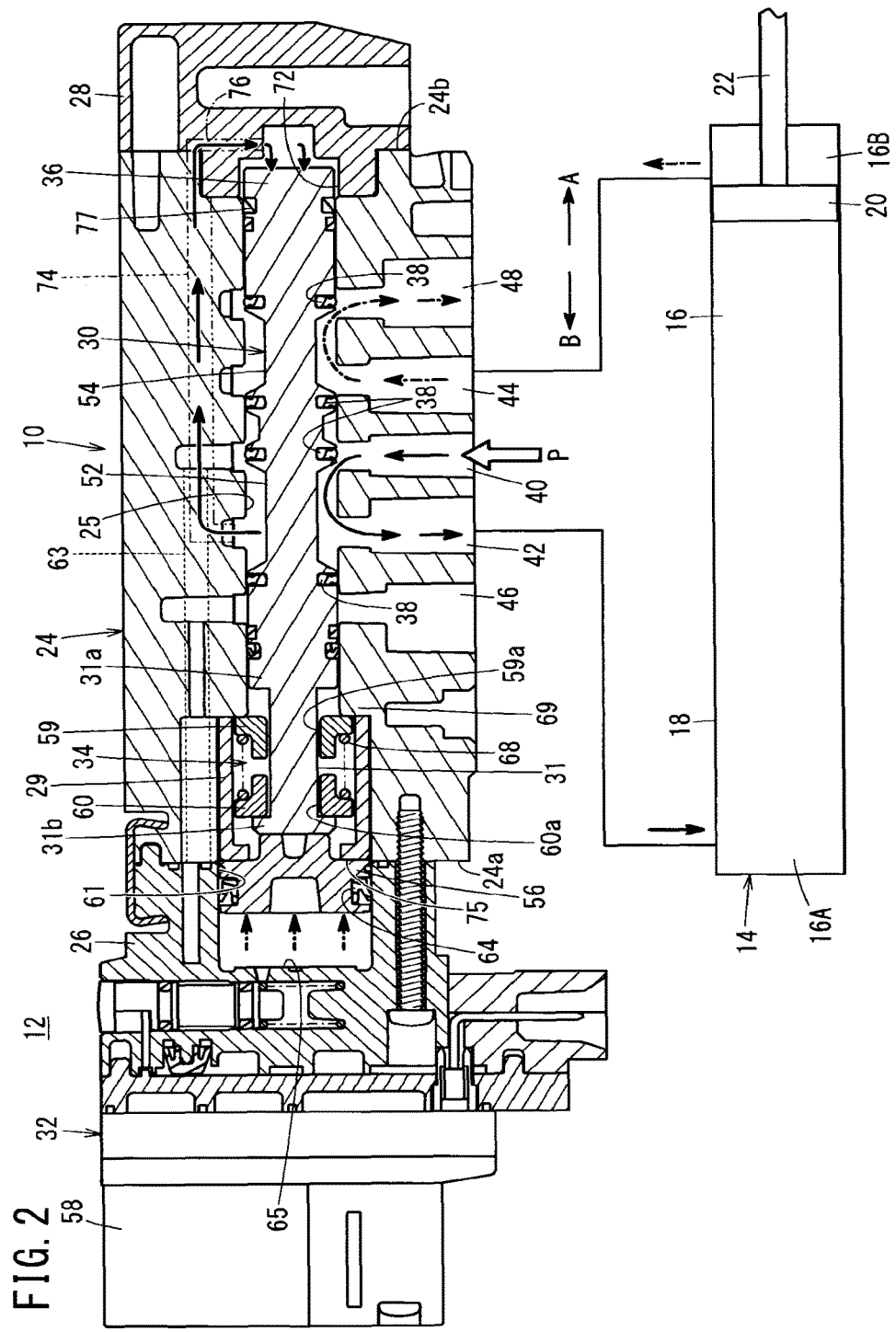
FIG. 2 is a second explanatory drawing of operations of the pneumatic system shown in FIG. 1.

From the condition shown in FIG. 1, when the spool drive unit 32 is placed in an on state, a pressure (supply pressure P) of the compressed air supplied to the air supply port 40 is exerted on the pressure receiving surface of the drive piston 56, whereby the spool 30 is pressed in the A direction by the drive piston 56. As a result, as shown in FIG. 2, the spool 30 is moved to a position at which the air supply port 40 and the first output port 42 are placed in communication, and the second output port 44 and the second exhaust port 48 are placed in communication. Accompanying movement of the spool 30 in the A direction, the second movable member 60, which is in engagement with the stepped portion 31b, also is moved in the A direction, and the elastic member 68 is compressed in the axial direction.

Moreover, in this case, although the supply pressure P also is exerted on the piston section 36 that communicates with the first output port 42 through the air flow passage 74 and the communication passage 76, since the pressure receiving area of the drive piston 56 is greater than the pressure receiving area of the piston section 36, the force at which the drive piston 56 presses on the spool 30 in the A direction is greater than the force with which the piston section 36 biases the spool 30 in the B direction. Consequently, the drive piston 56 is capable of causing the spool 30 to be moved in the A direction as described above, in opposition to the biasing force of the piston section 36 in the B direction.

Accompanying movement of the spool 30 in this manner, the compressed air that is supplied to the air supply port 40 is introduced into the first pressure chamber 16A of the air cylinder 14 through the first output port 42. As a result, the air cylinder 14 performs a working stroke to advance the piston rod 22. At this time, since the second output port 44 and the second exhaust port 48 are in communication, the air that has accumulated in the second pressure chamber 16B of the air cylinder 14 flows into the second output port 44, and further is exhausted to the exterior through the second exhaust port 48. Consequently, by the solenoid valve 58 being maintained in the on state, as shown in FIG. 2, the piston 20 of the air cylinder 14 is moved to the stroke end on the working side and stopped.

Figure 3:
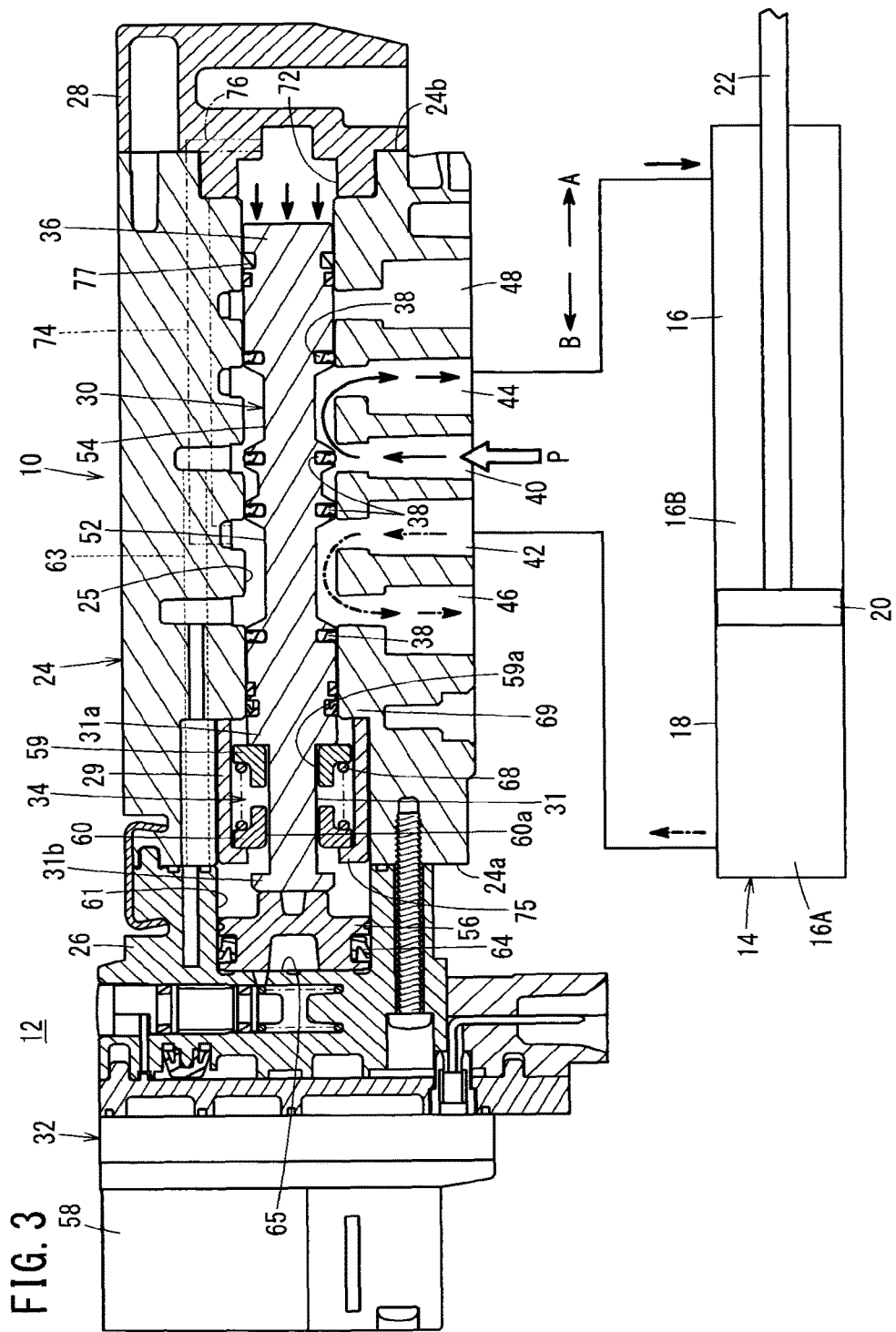
FIG. 3 is a third explanatory drawing of operations of the pneumatic system shown in FIG. 1.

Next, when the solenoid valve 58 of the spool drive unit 32 is turned off while the supply of compressed air to the air supply port 40 is maintained, as shown in FIG. 3, the spool 30 is positioned in a position (first position) at which the first output port 42 and the first exhaust port 46 are placed in communication, and the air supply port 40 and the second output port 44 are placed in communication.

More specifically, when the solenoid valve 58 is turned off, a condition is brought about in which the pressure of the compressed air supplied to the air supply port 40 is not exerted on the pressure receiving surface of the drive piston 56. As a result, the force with which the piston section 36 biases the spool 30 in the B direction based on the pressure of the first output port 42 becomes greater than the force at which the biasing mechanism 34 biases the spool 30 in the A direction, whereby the spool 30 is made to move in the B direction in opposition to the biasing force of the biasing mechanism 34. At this time, the first movable member 59 is pressed by the stepped portion 31a of the spool 30 and is moved in the B direction, and the second movable member 60 is stopped by engagement with the second stopper portion 75 of the tubular member 29.

Accompanying movement of the spool 30 in this manner, the compressed air that is supplied to the air supply port 40 is introduced into the second pressure chamber 16B of the air cylinder 14 through the second output port 44. As a result, the air cylinder 14 performs a return stroke to retract the piston rod 22. At this time, the air that has accumulated in the first pressure chamber 16A of the air cylinder 14 flows into the first output port 42, and further is exhausted to the exterior through the first exhaust port 46.

In addition, when the pressure of the first output port 42 is lowered accompanying the arrival of the piston 20 of the air cylinder 14 at the stroke end on the return side, the force with which the piston section 36 biases the spool 30 in the B direction based on the pressure of the first output port 42 becomes smaller than the force at which the biasing mechanism 34 biases the spool 30 in the A direction.

Therefore, as shown in FIG. 4, the spool 30 is made to move in the A direction under the biasing action of the biasing mechanism 34. At this time, the first movable member 59 of the biasing mechanism 34 is stopped at a position at which it is engaged by the first stopper portion 69. The spool 30 also is stopped accompanying stoppage of the first movable member 59. As a result, the spool 30 is positioned at a position (second position/closed center) at which the air supply port 40 does not communicate with either of the first output port 42 and the second output port 44.

As a result, supply of compressed air into the second pressure chamber 16B of the air cylinder 14 is blocked. In this manner, after the piston 20 of the air cylinder 14 has reached the stroke end on the return side, since unnecessary compressed air is not supplied to the second pressure chamber 16B of the air cylinder 14, air consumption can be reduced.

In accordance with the flow passage switching unit 10 according to the present embodiment, as described above, when the piston 20 reaches its stroke end during the return stroke of the air cylinder 14, the spool 30 is made to move by the elastic force of the biasing mechanism 34 to a position (closed center) at which the air supply port 40 does not communicate with either of the first output port 42 and the second output port 44. Therefore, simultaneously with completion of the return stroke of the air cylinder 14, any unnecessary introduction of compressed air into the second pressure chamber 16B is blocked, and a rise in pressure of the second pressure chamber 16B is stopped. Consequently, at the time of the return stroke, due to a savings in air consumption, running costs can be suppressed.

Further, as described above, since unnecessary introduction of compressed air into the second pressure chamber 16B of the air cylinder 14 is blocked, the interior of the second pressure chamber 16B is not increased in pressure any more than necessary. Consequently, during the working stroke of the next cycle, resistance to movement due to the pressure of the second pressure chamber 16B is reduced, and as a result, an increase in the speed of the working stroke can be expected.

According to the present embodiment, since the pressure receiving area of the drive piston 56 is greater than the pressure receiving area of the piston section 36, by making use of the difference in the pressure receiving areas, owing to the drive piston 56 that receives the pressure of the compressed air, the spool 30 can reliably be moved to the position at which the air supply port 40 and the first output port 42 are placed in communication. Thus, the working stroke of the air cylinder 14 can be performed without any problems.

Furthermore, in the interior of the valve body 24, the first stopper portion 69, which is capable of stopping the biasing mechanism 34 by engagement therewith, may be provided, and when the spool 30 moves from the first position (FIG. 3) to the second position (FIG. 4) under a biasing action of the biasing mechanism 34, the spool 30 may be stopped in the second position (FIG. 4) as a result of the first stopper portion 69 stopping the biasing mechanism 34 by engagement therewith. Due to such a structure, the spool 30 can reliably be moved to the second position accompanying completion of the return stroke of the air cylinder 14.

The present invention is not limited to the embodiment described above, and various additional or modified arrangements may be adopted therein without departing from the essential scope of the present invention as defined in the appended claims.

What is claimed is:

1. A flow passage switching unit, which is used in a pneumatic system equipped with an air cylinder, the air cylinder being configured to perform a working stroke of a piston by introduction of compressed air into a first pressure chamber, and perform a return stroke of the piston by introduction of the compressed air into a second pressure chamber, the flow passage switching unit comprising:
   a valve body in which there is formed a valve hole, an air supply port to which compressed air is supplied from a pressure supply source, a first output port connected to the first pressure chamber, a second output port connected to the second pressure chamber, and an exhaust port that is opened to atmosphere, wherein the air supply port, the first output port, the second output port, and the exhaust port communicate with the valve hole;
   a spool including a first end and a second end in an axial direction of the spool, the spool being configured to be slidable reciprocally in the axial direction in the valve hole;
   a spool drive unit including a solenoid valve, the spool drive unit being configured to drive the spool in a first direction from a side of the first end toward a side of the second end, by exerting a force on the first end of the spool depending on an energized state of the solenoid valve;
   a biasing mechanism disposed in an interior of the valve body, the biasing mechanism being configured to bias the spool elastically; and
   a piston section arranged in the interior of the valve body, the piston section being configured to exert a force on the spool in a second direction opposite to the first direction based on a pressure of the first output port;
   wherein, when the spool drive unit is in an off state and the force exerted by the piston section based on the pressure of the first output port is greater than a biasing force exerted by the biasing mechanism in the first direction, the spool is positioned in a first position that allows communication between the first output port and the exhaust port, and allows communication between the air supply port and the second output port, in opposition to the biasing force exerted by the biasing mechanism in the first direction, by the force exerted by the piston section based on the pressure of the first output port,
   wherein when the spool drive unit is in the off state, the spool is moved to a second position when the force exerted by the piston section based on the pressure of the first output port is less than the biasing force exerted by the biasing mechanism in the first direction, due to the biasing force exerted by the biasing mechanism in the first direction, in the second position, the air supply port is not allowed to communicate with either of the first output port and the second output port, and
   wherein the spool having, moved to the second position is retained at the second position by the biasing force exerted by the biasing mechanism.

2. The flow passage switching unit according to claim 1, wherein:
   the spool drive unit includes a drive piston configured to receive a pressure of the compressed air when the air supply port and the first output port are placed in communication; and
   a pressure receiving area of the drive piston is greater than a pressure receiving area of the piston section.

3. The flow passage switching unit according to claim 1, wherein:
   a stopper portion configured to stop the biasing mechanism by engagement with the biasing mechanism, is disposed in the interior of the valve body; and
   when the spool moves from the first position to the second position under a biasing action of the biasing mechanism, the spool is stopped in the second position as a result of the stopper portion stopping the biasing mechanism by engagement with the biasing mechanism.

* * * * *